United States Patent [19]

McKeon et al.

[11] 4,020,712
[45] May 3, 1977

[54] BUSHING LINK CHAIN

[75] Inventors: John F. McKeon, Carmel; Roy E. Lambert, Indianapolis, both of Ind.

[73] Assignee: FMC Corporation, San Jose, Calif.

[22] Filed: June 19, 1975

[21] Appl. No.: 588,448

Related U.S. Application Data

[62] Division of Ser. No. 535,070, Dec. 20, 1974, Pat. No. 3,931,706.

[52] U.S. Cl. .......................... 74/250 R; 74/255 R; 59/4; 59/15
[51] Int. Cl.² ................... F16G 13/06; B21L 9/02
[58] Field of Search ......... 74/250 R, 250 C, 255 R, 74/256; 59/4, 5, 6, 8, 13, 14, 15, 35

[56] References Cited

UNITED STATES PATENTS

| | | | |
|---|---|---|---|
| 1,689,556 | 10/1928 | Nichols | 74/250 R X |
| 2,272,837 | 2/1942 | Getz et al. | 74/250 R |
| 2,291,182 | 7/1942 | Blalack | 74/250 R |
| 2,645,133 | 7/1953 | David | 74/250 R |
| 2,793,536 | 5/1957 | Onulak | 59/8 |
| 3,119,276 | 1/1964 | Pearson | 74/250 R |
| 3,141,347 | 7/1964 | Onulak et al. | 74/250 R |
| 3,192,785 | 7/1965 | Pearson | 74/255 R |
| 3,514,941 | 6/1970 | Mueller | 198/189 |

Primary Examiner—Samuel Scott
Assistant Examiner—Allan R. Burke
Attorney, Agent, or Firm—J. F. Verhoeven; J. W. Edwards; C. E. Tripp

[57] ABSTRACT

A blank, having a pair of parallel bushing forming strips that are intermediately connected by a web, is formed from stock. The blank is bent and curled in a progressive die to form a bushing link that includes a pair of cylindrical bushings integral with the web. Rollers can be slipped longitudinally over the bushing ends opposite from the web and an inside plate is welded to the bushing ends to form a roller link. Such roller links are alternately arranged with pin-links to form a roller chain. A bushing chain can be formed in essentially the same manner as the roller chain by omitting the rollers from the bushing links.

4 Claims, 7 Drawing Figures

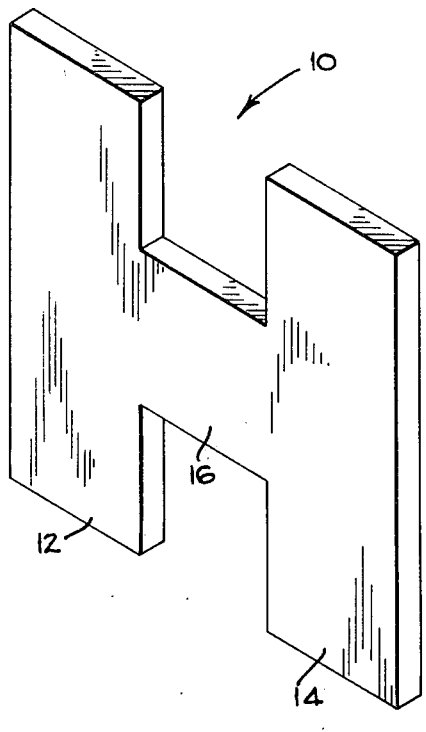
FIG_1
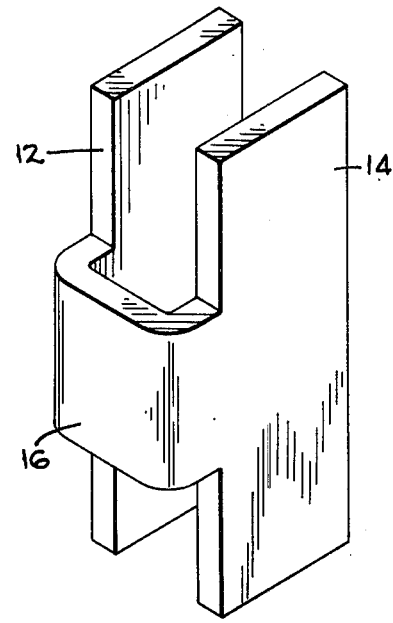
FIG_2
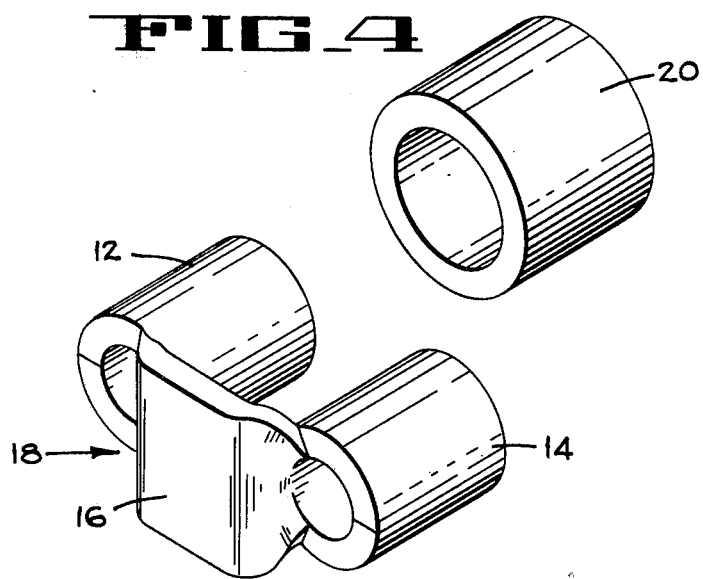
FIG_4
FIG_3

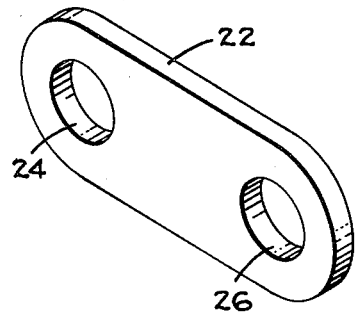
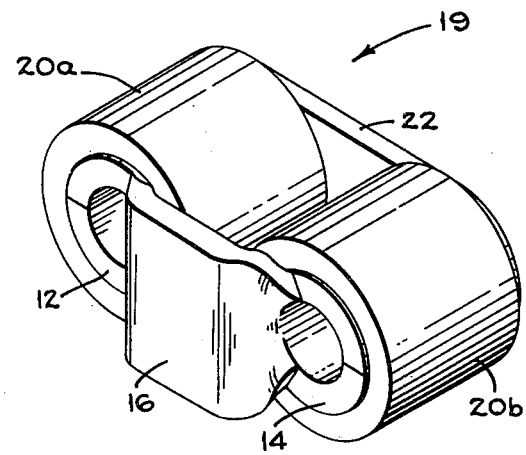
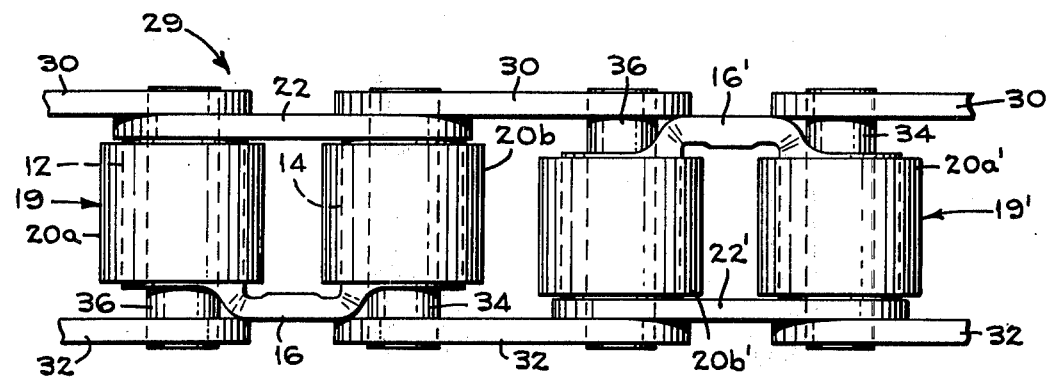

BUSHING LINK CHAIN

This is a division of application Ser. No. 535,070 filed Dec. 20, 1974, now U.S. Pat. No. 3,931,706.

BACKGROUND OF THE INVENTION

1. Field of the Invention

This invention relates to chain making. More specifically, the invention pertains to forming a bushing link, that includes a pair of parallel bushings and and integral side plate joining the bushings, which together with a second side plate form an inside link of a chain.

2. Description of the Prior Art

Chain links with integral bushings and side bars have been formed from sheet metal blanks. A U-shaped link with two parallel side plates and an integral bushing is shown in U.S. Pat. Nos. 2,793,536 and 3,125,850. An integral block link having two parallel side plates and two bushings is disclosed by U.S. Pat. Nos. 3,119,176 and 3,192,785. In each of the above mentioned patents, the disclosed bushings within the links have at each end an integral side plate extending perpendicular to the bushing and thus, a roller cannot be slipped longitudinally about the bushing.

Roller chains have been assembled from separately formed bushings and inside plates. Such construction requires a link weight of material, a link production cost, and a chain assembly cost that can be significant when considered in view of the many links in roller chains.

SUMMARY OF THE INVENTION

A chain can be formed with bushings links to reduce the weight of material and lower production costs. Such links include a pair of parallel bushings integral with a web that serves as a side bar or inside plate. These links are formed in a progressive die from strip steel stock. A blank that includes a pair of parallel bushing forming strips connected intermediately by a web is first formed. Then, the web is bent to position the strips perpendicular to the original plane of the web and parallel with each other. Each strip is then curled outwardly from the other strip to form a bushing.

In a preferred form of the invention, rollers are slipped longitudinally about the bushings and an inside plate is welded to the ends of the bushings to form a roller link. Such roller links are alternately arranged with conventional pin-links to form a roller chain with the integral web side of each bushing link being reversed from the integral web side of the bushing links nearest each end thereof.

BRIEF DESCRIPTION OF THE DRAWING

FIGS. 1-3 are perspective views illustrating the steps of forming a bushing link from a blank in accordance with the present invention.

FIG. 4 is a perspective view of a roller that fits upon the bushings of the bushing link.

FIG. 5 is a perspective view of an inside plate.

FIG. 6 is a perspective view of a roller link formed by the bushing link, rollers and inside plate.

FIG. 7 is a plan view of a roller chain formed with roller links that include bushing links made in accordance with the present invention.

DESCRIPTION OF THE PREFERRED EMBODIMENTS

With reference to FIG. 1, a blank 10 is shown having a pair of parallel bushing forming strips 12 and 14 that are connected intermediately by a web 16. Such a blank is formed by stamping or cutting from a stock of strip steel and the blank can be bent and curled in a progressive die to form a bushing link 18, as shown in FIG. 3.

After forming the blank 10, the web 16 is bent to position the bushing forming strips 12 and 14 in planes perpendicular to the original plane of the web, as shown in FIG. 2. The outer surfaces of the strips are spaced by a distance that equals the pitch of the bushings to be formed less the inside diameter of one bushing. Thus, the outer surfaces of the strips are positioned tangent to the internal bores of the bushings to be formed. Then, the strips are curled outwardly from each other to form cylindrical bushings 12 and 14, as shown in FIG. 3. The bushings are integral with the web 16 that serves as an inside plate and the combination bushings and plate define the bushing link 18.

The bushing link 18 can be used to form a roller link 19, as shown in Fig. 6. A roller 20, as shown in FIG. 4, is a cylindrical ring which turns over a bushing. A similar roller 20a, shown in FIG. 6, is slipped longitudinally over bushing 12 and a similar roller 20b is slipped longitudinally over bushing 14. An inside plate 22, shown in FIG. 5, has therein openings 24 and 26 that correspond to the internal bores of the bushings 12 and 14. This inside plate is then placed in abutment with the ends of the bushings opposite from the web 16, the holes in the plate being aligned with the internal bores of the bushings, and the plate is welded to the bushings to form the roller link.

Since the plate 22 is welded to the ends of the bushings 12 and 14, the welds and the plate prevent the bushings from uncurling or spreading apart. The rollers 20a and 20b also restrain the bushings from uncurling. The roller links 19 can then be assembled into a roller chain 29, as shown in FIG. 7.

The inside links of the roller chain 29 are formed by roller links 19 and 19'. It will be noted that the roller link 19' positioned within the chain has a web 16' that serves as an inside plate and is reversed to a position on the opposite side of the chain from the web 16 of roller link 19. As further roller links are added to the chain, this alternate positioning of the webs is repeated so that the integral web of every roller link is reversed to the opposite side of the chain from the integral webs of the roller links nearest each end thereof. The outside links of the roller chain are conventional pin links consisting of pin-link plates 30 and 32 assembled with pins 34 and 36. The pins extend through the bushings of the roller links 19 and 19' and through the pin link plates 30 and 32 that can be welded or riveted to the bushings. Thus, the inside roller links and outside pin-links form a roller chain.

With reference to FIG. 3, the ends of each curled bushing forming strip 12 and 14 meet along a horizontal plane in which the centerlines of each bushing and the centerline of the web 16 are located. This is due to the web, as shown in FIG. 1, extending between the midpoints of the bushing forming strips. Should it be desired to have the ends of the bushing forming strips come together at locations that are not on the horizontal centerline plane of the bushing link 18, the blank can be modified to position the web to extend between the bushing forming strips at a location spaced either above or below the midpoints of the strips. If there is any difficulty in curling the bushing forming strips due to the integral adjacent web portions. the web can be notched to narrow the integral adjacent web protions and reduce the arc lengths of the curled bushing forming strips along which the web is joined.

A modified embodiment of the invention would be a bushing chain, which somewhat resembles a roller chain, but differs from the latter in that the bushings between the side links are not provided with rollers. The operation of this rollerless chain is similar to that of a solid block chain. It will fit sprockets intended for roller chains, provided the pitch and diameter of the bushings correspond with the pitch and diameter of the intended rollers. Such a bushing chain could be formed in the same manner as roller chain 29 by simply omitting the rollers 20. It might also be desirable to weld the abutting ends of each curled bushing forming strip 12 and 14 together on the side adjacent the web 16 to restrain the bushing forming strips from uncurling.

Although the best mode contemplated for carrying out the present invention has been herein shown and described, it will be understood that modification and variation may be made without departing from what is regarded to be the subject matter of the invention.

What is claimed is:

1. In a chain having alternately arranged inside links and outside links, each outside link including two generally parallel pin-link plates that extend longitudinally of the chain to form tension members and two pins that extend transversely of the chain between the pin-link plates to interconnect those plates, each inside link including an inside plate and a bushing link, wherein the improvement comprises a pair of generally cylindrical bushings that extend parallel with each other in a direction transversely of the chain and an integral intermediate web that extends longitudinally of the chain, said bushings having end faces that are generally perpendicular to the direction transversely of the chain in which the bushings extend, said bushings having arcuate portions forming the cylindrical surfaces thereof with those portions of adjacent bushings that are directly opposed to each being the adjacent opposed arcuate portions, said intermediate web extending generally in a plane parallel to the end faces of the bushings between adjacent opposed arcuate portions at adjacent ends of the bushings where the web is integral with the bushings, said bushings having internal bores for receiving the pins of adjacent outside links, said inside plate having openins therein for receiving pins of adjacent outside links.

2. The improved bushing link chain described in claim 1, including welds fusing the inside link plate to each bushing end that is located opposite from the adjacent bushing ends where the intermediate web is integral with the bushings, said inside plate openings being aligned with the intgernal bores of the bushings for receiving pins of adjacent outside links.

3. The improved bushing link chain as described in claim 1, wherein said inside links are arranged in an alternate order with the intermediate web of one inside link being located on the opposite side of the chain from the intermediate webs of the nearest adjacent inside links.

4. The improved bushing link chain as described in claim 1, wherein each bushing has a roller mounted thereon for rotation about the bushing.

* * * * *